United States Patent
Deneszczuk et al.

(10) Patent No.: US 10,267,368 B2
(45) Date of Patent: Apr. 23, 2019

(54) SPRING PACK ASSEMBLY FOR A TORQUE TRANSMITTING DEVICE

(71) Applicant: GM Global Technology Operations LLC, Detroit, MI (US)

(72) Inventors: Gregory W. Deneszczuk, Royal Oak, MI (US); Joaquin J. Affonso, III, Macomb, MI (US); Douglas J. Dwenger, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 15/370,546

(22) Filed: Dec. 6, 2016

(65) Prior Publication Data

US 2018/0156283 A1 Jun. 7, 2018

(51) Int. Cl.
- *F16D 25/12* (2006.01)
- *F16D 25/0638* (2006.01)
- *F16D 121/04* (2012.01)
- *F16D 127/02* (2012.01)

(52) U.S. Cl.
CPC ......... *F16D 25/12* (2013.01); *F16D 25/0638* (2013.01); *F16D 2121/04* (2013.01); *F16D 2127/02* (2013.01)

(58) Field of Classification Search
CPC .. F16D 25/0638; F16D 25/12; F16D 2121/02; F16D 2121/04; F16D 2127/02; F16D 13/71; F16F 1/122; F16F 1/125; F16F 3/04
See application file for complete search history.

(56) References Cited

U.S. PATENT DOCUMENTS

| | | | |
|---|---|---|---|
| 5,772,191 A * | 6/1998 | Nakano | F16F 1/122 267/179 |
| 5,992,834 A | 11/1999 | Dover et al. | |
| 6,244,407 B1 * | 6/2001 | Kremer | F16D 13/72 192/113.35 |
| 8,256,600 B2 | 9/2012 | Reed et al. | |
| 8,991,583 B2 | 3/2015 | Dwenger | |

(Continued)

FOREIGN PATENT DOCUMENTS

| | | | |
|---|---|---|---|
| DE | 102013221181 B4 | 9/2014 | |
| JP | 06159418 A | 6/1994 | |
| JP | H06-159418 * | 6/1994 | ................ F16F 3/04 |

*Primary Examiner* — Jacob S. Scott
*Assistant Examiner* — Lori Wu

(57) ABSTRACT

A torque transmitting device having a spring pack assembly, includes a first spring retainer ring abutting the hydraulically actuated piston, a second spring retainer ring abutting the piston housing, and a plurality of coiled springs biasing the first spring retainer ring apart from the second retainer ring, thereby urging the hydraulically actuated piston slideably apart from the fixed piston housing. The first and second spring retainer rings includes a plurality of radially extending spring support surfaces defining center openings and a plurality of axially extending tabs. The first and second spring retainer rings are coaxially disposed such that the plurality of tabs of one spring retainer ring extends through the opening of the other spring retainer ring. The tab includes a width sufficiently wide to support the inner diameter of the coiled spring to prevent the spring from bowing out.

19 Claims, 5 Drawing Sheets

(56) References Cited

U.S. PATENT DOCUMENTS

2009/0235815 A1* 9/2009 Nishimura .......... F16D 25/0638
                                                    92/240
2014/0110214 A1* 4/2014 McFarland ......... F16H 63/3026
                                                    192/109 F

* cited by examiner

SPRING PACK ASSEMBLY FOR A TORQUE TRANSMITTING DEVICE

INTRODUCTION

The present disclosure relates to a torque transmitting device for an automatic transmission, and more particularly to a spring pack assembly for the torque transmitting device.

BACKGROUND

Automatic transmissions for motor vehicles commonly employ torque transmitting devices for the selective transmission of torque between transmission components. For example, hydraulically actuated friction clutches are used to hold and release elements of a planetary gear set in order to produce the various gear ratios required for the operation of the motor vehicle. A hydraulically actuated clutch typically includes a hydraulic piston housing, a hydraulically actuated piston disposed within the hydraulic piston housing for selectively engaging a multi-plate clutch pack, and a return spring pack assembly for urging the hydraulically actuated piston apart from the multi-plate clutch pack.

A typical return spring pack assembly includes a plurality of coiled springs retained between the two co-axially located spring retainer plates. The coiled springs are evenly angularly spaced on the spring retainer plates. Each of the coiled springs includes a length relatively larger than the diameter of spring. During high speed rotation of the return spring pack assembly about a rotational axis, the centrifugal forces distort and deform the coiled spring by bowing the length of the coiled spring radially outward with respect to the rotational axis.

The deformation of the plurality of springs bowing radially outward causes compression instability which may result in a variable spring constant. The variable spring constant may produce a variable and unpredictable force in the opposition to the hydraulic force that actuates the piston to engage the multi-plate clutch pack. In addition, the instability deformation of the springs may clause excessive wear of the multi-plate clutch pack because the clutch plates are not fully engaged resulting in slipping of the clutch plates, and possible instability of the overall clutch assembly.

Thus, there is a need for an improved return spring pack assembly that reduces or eliminate the deformation of the coil spring due to centrifugal forces.

SUMMARY

According to an aspect of the disclosure, a spring pack assembly for a torque transmitting device is provided. The spring pack assembly includes a first spring retainer ring disposed about an axis and a second spring retainer ring coaxially disposed adjacent the first spring retainer ring. Each of the first and second spring retainer rings includes a plurality of spring support surfaces extending radially in a plane perpendicular to the axis. Each of the spring support surfaces includes a boss defining an opening. Each of the spring retainer rings also includes a plurality of tabs extending parallel to the axis, each of the tabs include a distal tab portion. The distal tab portions of one of the first and second spring retainer rings are aligned with and extend through the openings of the other of the first and second spring retainer rings.

In an additional aspect of the present disclosure, the spring support surfaces are evenly angularly spaced about the axis and the axially extending tabs are interposed between the radially extending spring support surfaces.

In another aspect of the present disclosure, each of the plurality of tabs includes a proximal tab portion extending integrally from the respective first and second retainer rings and the distal tab portion extending integrally from the proximal tab portion. The width of the proximal tab portion is wider than width of the distal portion.

In another aspect of the present disclosure, each of the plurality of tabs further includes a shoulder transitioning from the proximal tab portion to the distal tab portion. The width of the shoulder is wider than the width of the distal tab portion.

In another aspect of the present disclosure, each of the openings include an opening diameter larger than the distal tab width but smaller than the shoulder width such that the only the distal tab portion of the tab is insertable through the opening.

In another aspect of the present disclosure, the opening diameter is sufficiently greater than the distal tab width such the distal tab portion is freely moveable through the opening in the axial direction but restricted in movement in the radial direction.

In another aspect of the present disclosure, the spring pack assembly further includes a plurality of coiled springs axially disposed between the first and second spring retention plates. Each coiled spring includes a first end, a second end opposite the first end, and an inner spring diameter. The first end is fitted onto the boss of one of the first and second spring retainer rings and the second end is fitted over the tab of the other of the first and second spring retainer rings. The tab extends through the entire length of the coiled spring.

In another aspect of the present disclosure, the proximal tab portion extends through a sufficient length of the coiled spring to support the inner diameter of the coiled spring to prevent the coiled spring from bending in the shape of a bow. The distal portion includes a tapered distal end.

According to several aspects, a return spring pack assembly for a torque transmitting device is also provided. The return spring pack includes a first spring retainer ring having a plurality of radially extending spring support surfaces, each of the spring support surfaces defines an opening through the spring retainer ring; and a second spring retainer ring coaxially disposed with the first spring retainer ring, the second spring retainer ring includes a plurality of axially extending tabs aligned with the openings of the first spring retainer ring. Each of the tabs includes a distal portion extending through a corresponding opening. The return spring pack assembly also includes a plurality of coiled springs. Each of the coiled springs includes a first end supported by one of the plurality of spring support surfaces of the first spring retainer ring and a second end fitted over one of corresponding plurality of tabs of the second spring retainer ring.

In an additional aspect of the present disclosure, each of the plurality of tabs includes a proximal tab portion extending integrally from the second retainer ring and a distal tab portion extends integrally from the proximal tab portion. The distal tab portion includes a tapered end extending through the opening of the first spring retainer ring. The distal tab portion includes a distal tab width and the opening includes an opening diameter sufficiently larger than the distal tab width such that the distal tab portion is freely moveable through the opening in the axial direction but restricted in movement in the radial direction.

In another aspect of the present disclosure, each of the spring support surfaces includes a boss surrounding the opening. The boss is configured to locate the first end of the coiled spring onto the support surface of the first spring retainer ring.

According to several aspects, a torque transmitting device is also provided. The torque transmitting device includes a piston housing engaged to an interlocking member such as a hub assembly, a hydraulically actuated piston slideably disposed within the piston housing on the hub assembly, a piston housing fixable disposed within the clutch housing and adjacent the hydraulically actuated piston, and a spring pack assembly. The spring pack assembly includes a first spring retainer ring abutting the hydraulically actuated piston, a second spring retainer ring abutting the piston housing; and a plurality of coiled springs biasing the first spring retainer ring apart from the second retainer ring, thereby urging the hydraulically actuated piston slideably apart from the fixed piston housing. One of the first and second spring retainer rings includes a plurality of radially extending spring support surfaces, each of the spring support surfaces defines an opening; and the other of first and second spring retainer rings includes a plurality of tabs aligned with and extending through the openings on the spring support surfaces.

In an additional aspect of the present disclosure, each of the tabs includes a proximal tab portion extending integrally from the one of the first and second spring retainer ring, and a distal tab portion extending integrally from the proximal tab portion through the corresponding opening. Each of the plurality of tabs further includes a shoulder transitioning from the proximal tab portion to the distal tab portion, the shoulder includes a shoulder width greater than the diameter of the corresponding opening. The proximal tab portion includes a proximal tab width and a proximal tab length sufficient to support the inner diameter of the spring to prevent the coiled spring from bending in the shape of a bow. The distal tab portion includes a sufficient distal tab width for radial support of the tab by the opening while allowing for axial slideably movement through the opening.

In an additional aspect of the present disclosure, one of the hydraulic pistons and piston housing abutting the spring plate having the opening includes a pocket immediately adjacent the opening, wherein the pocket is configured to accept a portion of the distal portion of the tab.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
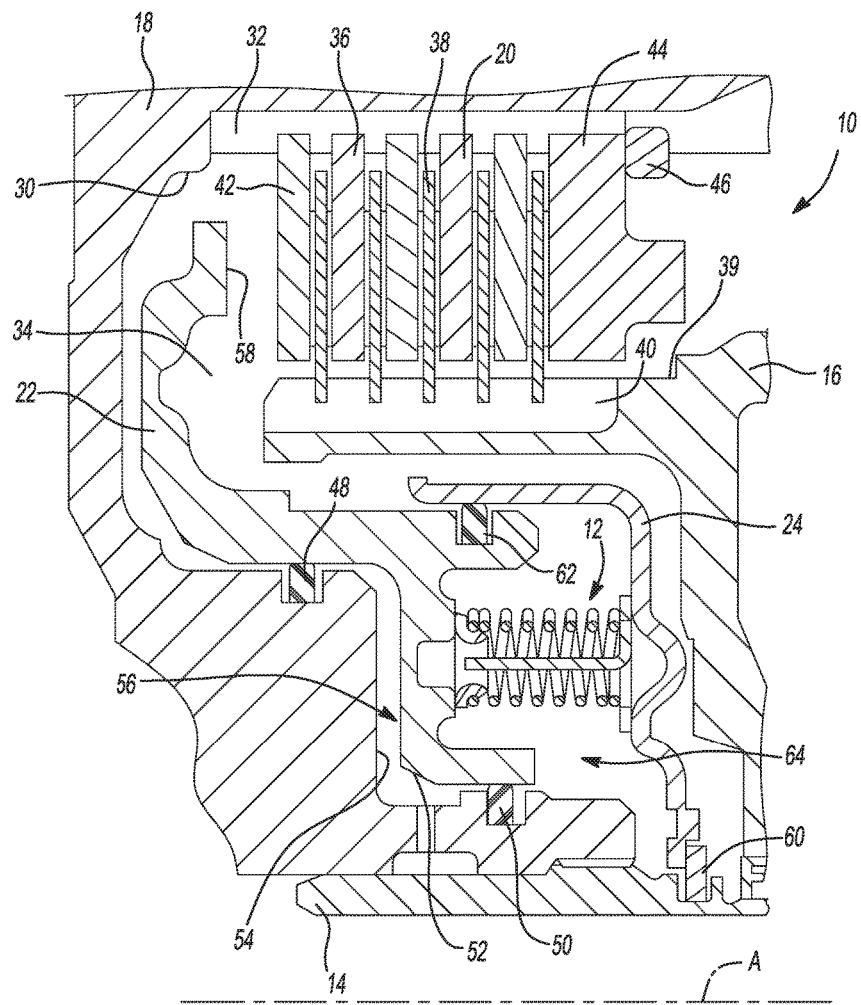
FIG. 1 is a cross-sectional view of a hydraulically actuated torque transmitting device having a spring pack assembly according to an exemplary embodiment.

Referring to the drawings, wherein like reference numbers refer to like components, FIG. 1 shows a cross-sectional view of a torque transmitting device 10 having a return spring pack assembly 12 used in a transmission (not shown) for a motor vehicle. The transmission may be that of a variable diameter pulley or sheave drive continuously variable transmission (CVT), a multi-speed planetary gear set automatic transmission, or a manual transmission without departing from the scope of the invention. The exemplary torque transmitting device 10 depicted is that of a hydraulically actuated piston multi-plate friction clutch. It should be appreciated that the torque transmitting device 10 may be that of a hydraulically actuated piston dog clutch, cone clutch, plate clutch, or other torque transmitting device having a return spring pack assembly 12 without departing from the scope of the invention.

Referring to FIG. 1, the components of the torque transmitting device 10 are arranged symmetrically about a longitudinal axis (A); however, only those components above the longitudinal axis (A) are shown in FIG. 1. The torque transmitting device 10 is configured to selectively transmit torque from a first interconnecting member 14 to a second interconnecting member 16 of the transmission. The interconnecting members 14, 16 may be connected to rotating components of the transmission such as input/out shafts, and elements of planetary gear sets, or to stationary components such as the transmission housing. The torque transmitting device 10 includes a clutch housing 18, a multi-plate friction clutch pack 20, a hydraulic piston 22, a piston housing 24, and the return spring pack assembly 12.

In the example shown, the clutch housing 18 is connected to the first interconnecting member 14 for common rotation about the longitudinal axis (A). The clutch housing 18 includes an interior surface 30 defining a splined portion 32 and a piston chamber 34. The multi-plate friction clutch pack 20 includes a plurality of axially moveable first clutch plates 36 mounted on the spline portion 32 of the clutch housing 18 and a plurality of axially moveable second clutch plates 38 disposed on a spline 39 defined on an exterior surface 40 of the second interconnecting member 16. The first clutch plates 36 are interleaved with the second clutch plates 38. Both the first and second clutch plates 36, 38 are sandwiched between an axially moveable first end plate 42 mounted on the spline portion 32 of the clutch housing 18 and a second end plate 44. The second end plate 44 is axially fixed on the spline portion 32 by a retainer ring 46.

The hydraulic piston 22 is disposed within the piston chamber 34 and is in sliding contact with a first hydraulic seal 48 and a second hydraulic seal 50 provided on the interior surface 30 of the clutch housing 18 for axial movement relative to the axis (A). The hydraulic piston 22 includes an outer surface 52 facing a rear portion 54 of interior surface 30 of the clutch housing 18 between the first and second hydraulic seals 48, 50. A first hydraulic chamber 56 is defined between the rear portion 54 of the interior surface 30 of the clutch housing 18 and the outer surface 52 of the hydraulic piston 22 assembly between the first and second hydraulic seals 48, 50. The hydraulic piston 22 includes a distal end 58 configured to selectively engage and transmit an axial force against the first end plate 42 of the multi-plate clutch pack 20.

The piston housing 24 is disposed within the piston chamber 34 and is fixably retained in position on the first interconnecting member 14 by a retainer ring 60 for common rotation with the first interconnecting member 14 and clutch housing 18. A third hydraulic seal 62 is disposed between the piston housing 24 and the hydraulic piston 22 such that the hydraulic piston 22 is axially moveable within the piston housing 24 while the piston housing 24 remains fixed in an axial direction. A second hydraulic chamber 64 is defined between the hydraulic piston 22 and the piston housing 24.

The spring pack assembly 12 is disposed within the second hydraulic chamber 64 and is in contact with the hydraulic piston 22 and the piston housing 24. The spring pack assembly 12 is configured to axially bias the hydraulic piston 22 apart from the axially fixed piston housing 24 such that the distal end 58 of the hydraulic piston 22 is not in contact with the first end plate 42.

The first hydraulic chamber 56 and the second hydraulic chamber 64 are hydraulically connected to a transmission hydraulic circuit (not shown). When the torque transmitting device 10 rotates about the longitudinal axis (A), the centrifugal force develops a pressure head within the clutch housing 18. This pressure head develops a static force of substantial equal magnitude on opposite sides of the hydraulic piston 22, thereby balancing the effect of centrifugal force. Upon selective pressurization of the first hydraulic chamber 56, the hydraulic pressure urges the hydraulic piston 22 axially towards the piston housing 24 and the distal end 58 against the first end plate 42, thereby compressing the multi-plate friction clutch pack 20.

As the distal end 58 of hydraulic piston 22 is urged against the first end plate 42, the second end plate 44 constraints the clutch plates 36, 38 from moving axially, thereby compressing the clutch plates 36, 38 together. The compression of the clutch plates 36, 38 creates friction to restrict the relative movement between the clutch plates 36, 38, thereby rotationally locking the first interconnecting member 14 to the second interconnecting member 16. When the hydraulic pressure in the first hydraulic chamber 56 is reduced, the spring pack assembly 12 urges the hydraulic piston 22 apart from the piston housing 24 and the distal end 58 apart from the first end plate 42, thereby unrestricting the relative movement between the first clutch plates 36 and second clutch plates 38, thus unlocking the first interconnecting member 14 from the second interconnecting member 16.

Figure 2:
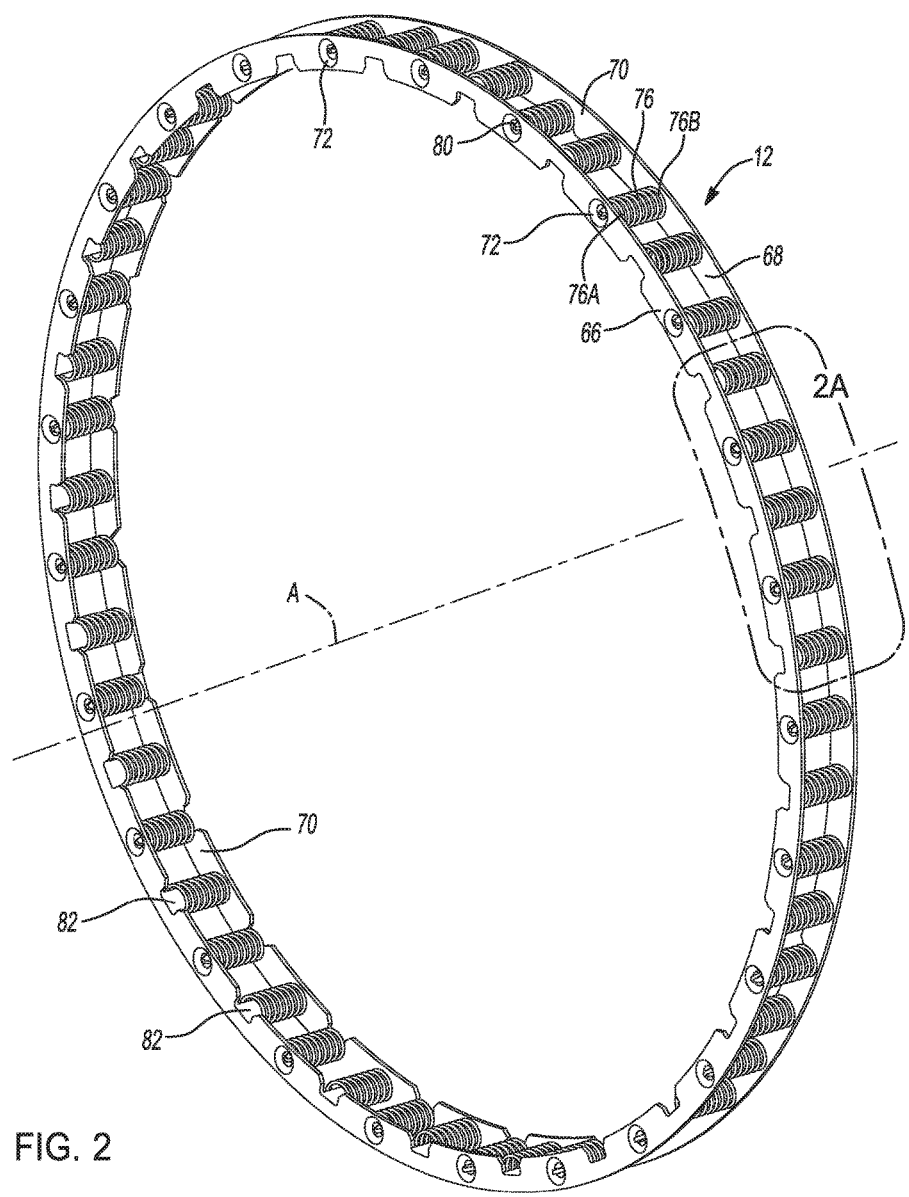
FIG. 2 is a perspective view of the spring pack assembly of FIG. 1 according to an exemplary embodiment.

Referring to FIG. 2, a perspective view of the spring pack assembly 12 is illustrated and will now be described. The spring pack assembly 12 includes a first spring retainer ring 66 and a second spring retainer ring 68 coaxially disposed about the axis (A). Each of the spring retainer rings 66, 68 include a plurality of spring support surfaces 70 extending radially parallel to a plane perpendicular to the axis (A). The spring support surfaces 70 are distributed at equal angular intervals about the axis (A). Each of the spring support surfaces 70 includes a boss 72 configured to locate a first end 76A of a coiled spring 76 on the support surface by engaging an inner diameter 78 of the coiled spring 76. An opening 80 is defined through the center of each of the bosses 72. Interposed between each support surface are tabs 82 integral with the spring retainer rings 66, 68. The tabs 82 extend perpendicular to the support surfaces 70 and parallel to the axis (A). The first spring retainer ring 66 is positioned with respect to the second retainer ring 68 such that the tabs 82 of one spring retainer ring 66, 68 are aligned with and extend through the central openings 80 of the other spring retainer ring 66, 68.

Figure 2A:
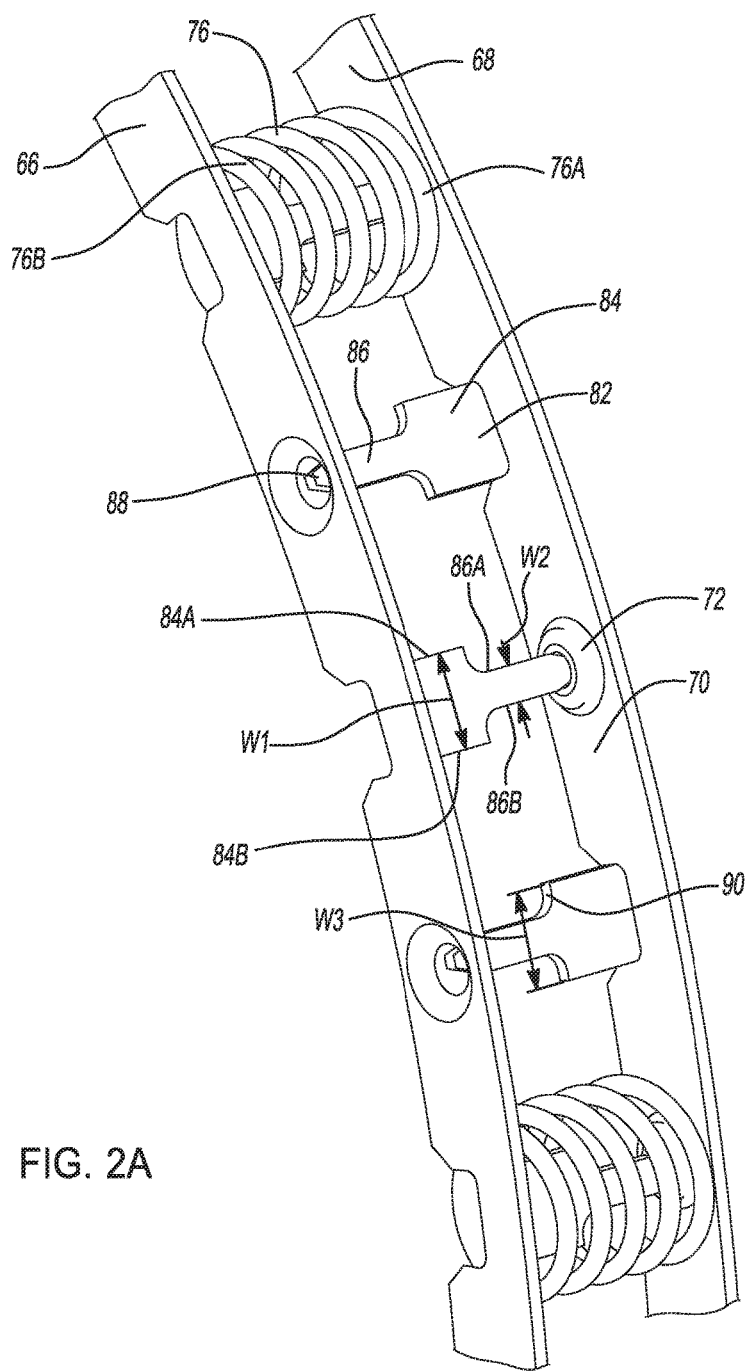
FIG. 2A is a detailed view of the spring pack assembly of FIG. 2 in region 2A.
Figure 2B:
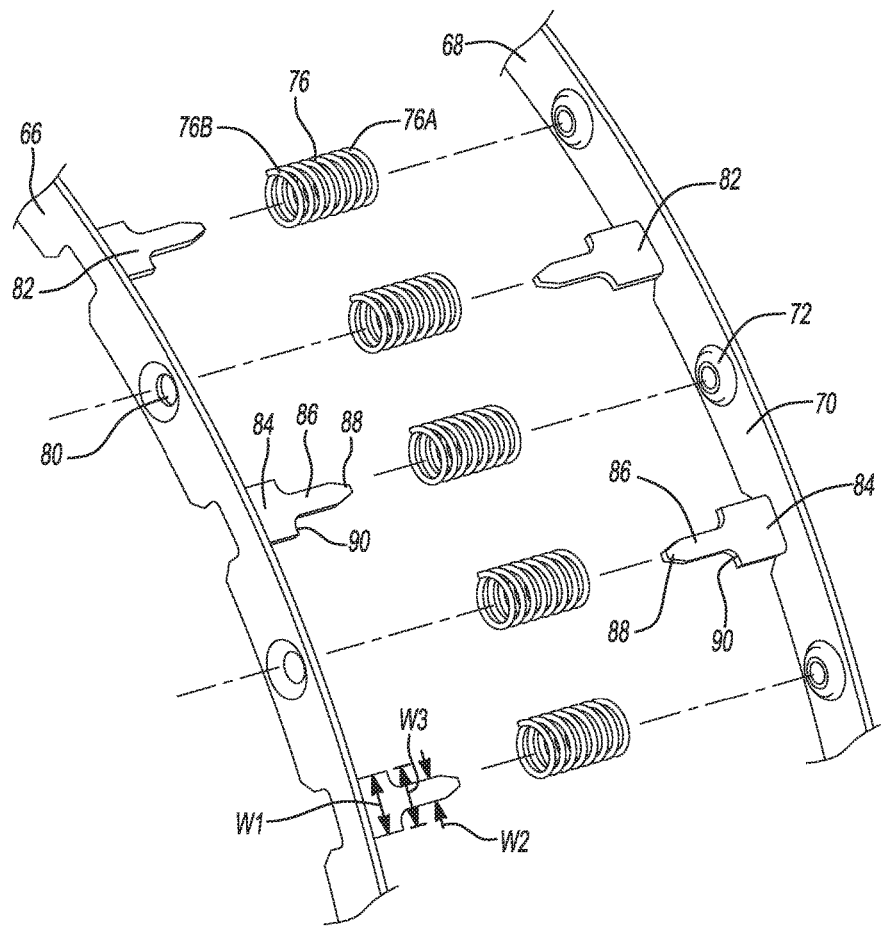
FIG. 2B is an exploded detailed view of the spring pack assembly of FIG. 2A.

Referring to FIG. 2A and FIG. 2B, a perspective detailed view of the region 2A of FIG. 2 and an exploded view of FIG. 2A, respectively, are illustrated and will now be described. For clarity of illustration, the coiled springs 76 are not shown in FIG. 2A disposed about the center three adjacent tabs 82. The first end 76A of the coiled spring 76 is fitted over the boss 72 on the spring support surface 70. The boss 72 is sufficiently wide to fit against the interior diameter 78 of the first end 76A of the coiled spring 76 to locate the spring 76 onto the support surface 70. The opposite second end 76B of the spring 76 is fitted over the corresponding tab 82. The tab 82 includes a first tab portion 84 (proximal tab portion 84) integrally extending from the spring retainer ring 66, 68 and a second tab portion 86 (distal tab portion 86) extending integrally from the first portion tab portion 84. The distal tab portion 86 includes a distal tapered end 88. The first tab portion 84 includes a first width (W1) defined between two opposing first edge surfaces 84A, 84B and the second tab portion 86 includes a second width (W2) defined between two opposing second edge surfaces 86A, 86B. The first width (W1) is wider than the second width (W2). The tab 82 includes a shoulder 90 transitioning from the second width (W2) to the first width (W1). The shoulder 90 includes a width (W3) that is substantially similar to the first width (W1) and wider than the second width (W2).

The first tab portion 84 extends midway through the inactive or free-condition length of each of the coiled springs 76. The width (W1) of the first tab portion 84 is sufficiently wide to support the coiled spring 76, thereby restricting the deformation of the coiled spring 76 due to centrifugal forces but not interfere with the compression constant of the coiled spring 76. The distal tab portion 86 extends through the remaining length of the coiled spring 76 and the opening 80 defined in the opposite boss 72. The width (W2) of the distal tab portion 86 cooperates with the opening 80 to restrict the bending of the tab 82 due to centrifugal forces. The opening 80 is sufficiently large to allow the distal tab portion 86 to extends through the opening 80 as the spring 76 is compressed between the two rings, but narrower than the width (W1) of the proximal portion 84 such that that the shoulder 90 of the tab 82 engages the raised boss 72 to limit the compression of the spring 76.

Figure 3A:
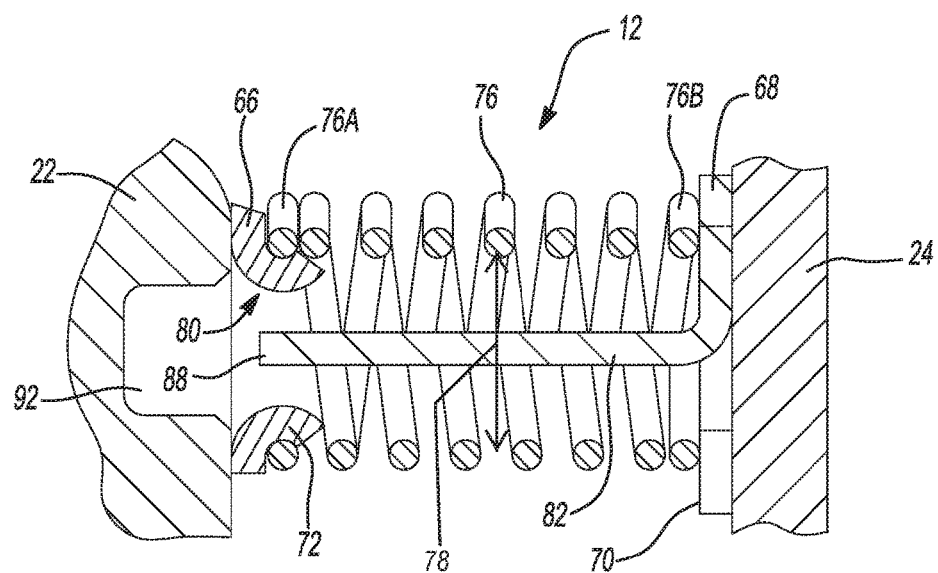
FIG. 3A is a cross-sectional view of the spring pack assembly of FIG. 1 in a first position according to an exemplary embodiment.

FIG. 3A shows a detailed cross-sectional view of the spring pack assembly 12 in the inactive or free-condition condition when the hydraulic piston 22 is disengaged from the clutch pack 20. The first end 76A of the spring 76 is held in positon by the protruding boss 72 on the spring support surface of the first retainer ring 66. The second end 76B of the spring 76 is fitted over the tab 82 and engages the support surface 70 on the second retainer ring 68. The tab 82 extends through the entire length of the coiled spring 76 and through the opening 80 defined in the center of the boss 72 on the first spring retainer plate 66. The distal tapered end 88 of the tabs 82 extends through and past the opening 80. An aperture or groove 92 is defined in the hydraulic piston 22 adjacent the opening 80 to allow for the distal tapered end 88 of distal portion 86 of the tab 82 to extend further through the opening 80 and into the aperture 92.

Figure 3B:
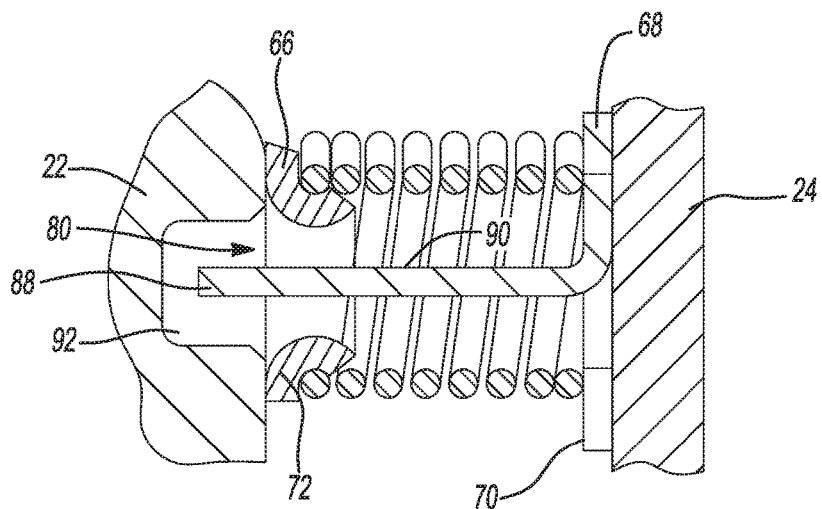
FIG. 3B is a cross-sectional view of the spring pack assembly of FIG. 1 in a second position according to an exemplary embodiment.

FIG. 3B shows a detailed cross-sectional view of the spring pack assembly 12 in a second compressed position when the hydraulic piston 22 is in an engaged position with the clutch pack 20. The pressurized first hydraulic chamber 56 urges the hydraulic piston 22 to engage the clutch pack 20, thereby compressing the spring pack assembly 12. As the spring pack assembly 12 is compressed, the shoulder 90 engages the boss 72 and limits the compression of the spring pack assembly 12. The tapered distal end 88 extends through the opening 80 and into the aperture 92 defined in the piston.

The various components of the spring pack assembly 12 can be made from any suitable material and by any suitable process. For example, the clutch housing 18, hydraulic piston 22, piston housing 24, and spring retainer rings 66, 68 can be machined, die casted, or molded. The hydraulic piston 22 and piston housing 24 can be attached to the clutch housing 18 by any suitable process, such as, for example, welding. Similarly, the coiled springs 76 as well as the other components associated with the spring retainer assembly 12 can be formed by any suitable process, such as, for example, rolling, forging, machining, or die casting.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A spring pack assembly, comprising:
    a first spring retainer ring disposed about an axis; and
    a second spring retainer ring coaxially disposed adjacent the first retainer ring;
    wherein each of the first and second spring retainer rings includes:
        a plurality of spring support surfaces extending radially in a plane perpendicular to the axis, each of the spring support surfaces includes a boss defining an opening, and
        a plurality of tabs extending parallel to the axis, each of the tabs include a distal tab portion having a distal tapered end; and
    wherein the distal tapered ends of the distal tab portions of one of the first and second spring retainer rings are aligned with and extend through and past the openings of the other of the first and second spring retainer rings.

2. The spring pack assembly of claim 1, wherein the spring support surfaces are evenly angularly spaced about the axis.

3. The spring pack assembly of claim 2, wherein the axially extending tabs are interposed between the radially extending spring support surfaces.

4. The spring pack assembly of claim 3, wherein each of the plurality of tabs includes:
    a proximal tab portion extending integrally from the respective first and second retainer rings and the distal tab portion extending integrally from the proximal tab portion;
    wherein the proximal tab portion includes a proximal tab width and the distal portion includes a distal tab width, and
    wherein the proximal tab width is wider than the distal tab width.

5. The spring pack assembly of claim 4, wherein each of the plurality of tabs further includes a shoulder transitioning from the proximal tab portion to the distal tab portion, the shoulder includes a shoulder width greater than the distal tab width.

6. The spring pack assembly of claim 5, wherein each of the openings include an opening diameter larger than the distal tab width but smaller than the shoulder width such that only the distal tab portion of the tab is insertable through the opening.

7. The spring pack assembly of claim 6, wherein the opening diameter is sufficiently greater than the distal tab width such the distal tab portion is freely moveable through the opening in the axial direction but restricted in movement in the radial direction.

8. The spring pack assembly of claim 7, further comprising:
    a plurality of coiled springs axially disposed between the first and second spring retention plates, each coiled spring includes a first end, a second end opposite the first end, and an inner spring diameter,
    the first end is fitted onto the boss of one of the first and second spring retainer rings and the second end is fitted over the tab of the other of the first and second spring retainer rings,
    wherein the tab extends through the entire length of the coiled spring.

9. The spring pack assembly of claim 8, wherein the proximal tab portion extends through a sufficient length of the coiled spring to support the inner diameter of the coiled spring to prevent the coiled spring from bending in the shape of a bow.

10. A return spring pack assembly for a torque transmitting device, comprising:
    a first spring retainer ring having a plurality of radially extending spring support surfaces, each of the spring support surfaces defines an opening through the spring retainer ring;
    a second spring retainer ring coaxially disposed with the first spring retainer ring, the second spring retainer ring includes a plurality of axially extending tabs aligned with the openings of the first spring retainer ring, wherein each tab includes a distal portion extending through a corresponding opening; and
    a plurality of coiled springs, each of the coiled springs includes a first end supported by one of the plurality of spring support surfaces of the first spring retainer ring and a second end fitted over one of corresponding plurality of tabs;
    wherein each of the plurality of tabs extends through the entire length of a corresponding coiled spring when the return spring pack assembly is in a free-condition.

11. The return spring pack assembly of claim 10,
    wherein each of the plurality of tabs includes a proximal tab portion extending integrally from the second retainer ring; and
    wherein the distal tab portion extends integrally from the proximal tab portion and includes a tapered end extending through the opening of the first spring retainer ring.

12. The return spring pack assembly of claim 11, wherein the distal tab portion includes a distal tab width and the opening includes an opening diameter sufficiently larger than the distal tab width such that the distal tab portion is freely moveable through the opening in the axial direction but restricted in movement in the radial direction.

13. The return spring pack assembly of claim 12, wherein each of the spring support surfaces includes a boss surrounding the opening, the boss is configured to locate the first end of the coiled spring onto the support surface of the first spring retainer ring.

14. A torque transmitting device, comprising:
    a clutch housing;
    a hydraulically actuated piston slideably disposed within the clutch housing;
    a piston housing fixably disposed within the clutch housing and adjacent the hydraulically actuated piston; and a spring pack assembly having a first spring retainer ring abutting the hydraulically actuated piston, a second spring retainer ring abutting the piston housing, and a plurality of coiled springs biasing the first spring retainer ring apart from the second retainer ring, thereby urging the hydraulically actuated piston slideably apart from the fixed piston housing, wherein:

one of the first and second spring retainer rings includes a plurality of radially extending spring support surfaces, each of the spring support surfaces defines an opening; and the other of first and second spring retainer rings includes a plurality of tabs aligned with and extending through the openings on the spring support surfaces;

wherein at least one of the plurality of tabs extends through the entire length of a corresponding coiled spring when the spring pack assembly is in a free-condition.

15. The torque transmitting device of claim 14, wherein each of the tabs includes a proximal tab portion extending integrally from the one of the first and second spring retainer ring, and a distal tab portion extending integrally from the proximal tab portion through the corresponding opening.

16. The torque transmitting device of claim 15, wherein each of the plurality of tabs further includes a shoulder transitioning from the proximal tab portion to the distal tab portion, the shoulder includes a shoulder width greater than the diameter of the corresponding opening.

17. The torque transmitting device of claim 16, wherein the proximal tab portion includes a proximal tab width and a proximal tab length sufficient to support the inner diameter of the spring to prevent the coiled spring from bending in the shape of a bow.

18. The torque transmitting device of claim 17, the distal tab portion includes a sufficient distal tab width for radial support of the tab by the opening while allowing for axial slideably movement through the opening.

19. The torque transmitting device of claim 18, wherein the one of the hydraulically actuated piston and piston housing abutting the spring retainer plate having the opening includes a pocket immediately adjacent the opening, wherein the pocket is configured to accept a portion of the distal portion of the tab.

* * * * *